(12) United States Patent
Ellis

(10) Patent No.: US 9,656,512 B1
(45) Date of Patent: May 23, 2017

(54) CIRCUMFERENTIAL MAGNETIC DEVICE COVERS AND METHODS OF MANUFACTURE

(71) Applicant: Harry William Ellis, St. Petersburg, FL (US)

(72) Inventor: Harry William Ellis, St. Petersburg, FL (US)

(73) Assignee: Ellis Graphics, Inc., Clearwater, FL (US)

( * ) Notice: Subject to any disclaimer, the term of this patent is extended or adjusted under 35 U.S.C. 154(b) by 41 days.

(21) Appl. No.: 14/864,138

(22) Filed: Sep. 24, 2015

Related U.S. Application Data

(60) Provisional application No. 62/055,927, filed on Sep. 26, 2014.

(51) Int. Cl.
*G04F 7/04* (2006.01)
*B44C 1/10* (2006.01)
*B32B 3/06* (2006.01)
*B32B 37/12* (2006.01)
*B32B 37/18* (2006.01)

(52) U.S. Cl.
CPC ............... *B44C 1/10* (2013.01); *B32B 3/06* (2013.01); *B32B 37/12* (2013.01); *B32B 37/182* (2013.01); *B32B 2255/10* (2013.01); *B32B 2307/208* (2013.01); *B32B 2327/00* (2013.01); *B32B 2398/20* (2013.01); *B32B 2451/00* (2013.01)

(58) Field of Classification Search
CPC ............... Y10T 428/24008; G09F 7/04; G09F 15/0025; G09F 15/0031; B65D 23/085
USPC ............................................................ 428/99
See application file for complete search history.

(56) References Cited

U.S. PATENT DOCUMENTS

| | | | |
|---|---|---|---|
| 4,288,516 | A | 9/1981 | Gaudioso |
| 4,293,627 | A | 10/1981 | Murphy et al. |
| 4,900,465 | A | 2/1990 | Nakada |
| 5,323,652 | A | 6/1994 | Parker |
| 5,393,445 | A | 2/1995 | Furuya et al. |
| 5,611,872 | A | 3/1997 | Manning et al. |
| 5,919,848 | A | 7/1999 | Minnick et al. |
| 2001/0008702 | A1 | 7/2001 | Vela |
| 2011/0033732 | A1 | 2/2011 | Aramaki et al. |

*Primary Examiner* — Alexander Thomas
(74) *Attorney, Agent, or Firm* — Robert J. Varkonyi; Smith & Hopen, P.A.

(57) ABSTRACT

A decorative magnetic cover is provided. The cover includes a plurality of octagonal and triangular openings, allowing the cover to securely attach to a rounded item without kinking or otherwise unsightly attachment. The cover includes a magnetic sheet having a magnetic face and nonmagnetic face, and a decorative element attached to the nonmagnetic face. The cover is manufactured by scoring the nonmagnetic face of the magnetic sheet and applying the decorative element to the nonmagnetic face. The resulting magnetic element is the cut to form the octagonal and triangular openings.

15 Claims, 7 Drawing Sheets

CIRCUMFERENTIAL MAGNETIC DEVICE COVERS AND METHODS OF MANUFACTURE

CROSS REFERENCE TO RELATED APPLICATIONS

This application claims priority to U.S. Provisional Patent Application No. 62/055,927, entitled "Circumferential Magnetic Device Covers and Methods of Manufacture", filed on Sep. 26, 2014, the contents of which are herein incorporated by reference.

FIELD OF INVENTION

This invention relates to magnetic device covers and methods of manufacturing the same. More specifically, the present invention provides a circular magnetic device cover having tapered edges adapted to cover the device without gaps or bulges in the cover.

BACKGROUND OF THE INVENTION

Magnetic sheets are formed by adding a magnetic alloy powder, such as iron-silicon alloys (Fe—Si—Al and the like), ceramic magnet powder, magnetic powder, nickel, cobalt, lodestone alnico, ferrite strontium-ferrite powder, or neodymium (NdFeB) powder, to some binder, such as an epoxy resin, acrylic resin, or rubber, and curing the composition to form into a sheet by hot pressing. The magnetic sheets are commonly used for depression of noise, RFID, and ornamental purposes. Ornamental magnetic covers are used to decorate ferromagnetic items, such as car body panels, bumpers, refrigerator doors. In ornamental use, the magnetic sheets can be screen printed, painted, or otherwise coated with a decorative element. For example, Vela (U.S. Appl. 2001/0008702) discloses flexible magnetic materials. However, the ornamental covers could not be flexed, due to cracking or splitting of the cover. The magnetic sheets are also used in forming thermochromic strips to detect gas contents within a container, as seen in Parker (U.S. Pat. No. 5,323,652).

However, many uses of ornamental covers on many items are frustrated by the shape of the item, and thus a poor fit of the ornamental cover onto the item. In most cases, the ornamental cover is a strip or flat element, requiring the item to have a flat surface to accommodate the cover. For example, propane tanks have a tubular body, with tapers on the upper and lower edges of the tubular body. As such, ornamental covers either cannot extend to the tapered edges, or have unpleasant overlaps of the cover.

SUMMARY OF THE INVENTION

The present invention addresses the shortcomings of the art by providing ornamentally cut magnetic sheets to form fit over propane tanks and similarly shaped items.

Geometric patterns of openings on the edges of the magnetic sheets permit the ornamental covers to tightly adhere to the tubular body and tapered edges of the tank. The geometric patterns are formed by scoring the non-magnetic faces of the magnetic sheets to allow flexibility of flat sheets, along with shaped cuts to take on the form of a semi spherical, tapered surface of a propane tank without kinking or overlap in the magnetic sheets, as is commonly the case with such magnetic covers. Optional shapes for the geometric patterns include hexagons, octagons, diamonds, squares, triangles, and star shapes.

As such, a magnetic cover is disclosed comprising a magnetic sheet having an upper longitudinal edge and a lower longitudinal edge, wherein the magnetic sheet comprises a magnetic face and a non-magnetic face. Examples of materials that are useful in forming the magnetic face include ceramic magnet powder, magnetic powder, strontium-ferrite powder, neodymium (NdFeB) powder, or a combination thereof bonded with synthetic rubber, elastic thermoplastic carrier, or binder and a curing agent. Specific variations and methods of making such films may be found in Aramaki, et al. (U.S. Appl. 2011/0033732). Alternatively, the magnetic face may be formed by bonding rare earth metals, as described in Furuya, et al. (U.S. Pat. No. 5,393,445), by magnetic polymers, as described by Minnick (U.S. Pat. No. 5,919,848), or by use of magnetic ink. Non-limiting examples of magnetic ink formulations include Murphy (U.S. Pat. No. 4,293,627), and Gaudioso (U.S. Pat. No. 4,288,516).

A decorative element is attached to the non-magnetic face. In some variations, the decorative element is a sheet made of vinyl, polyvinyl chloride, or polyvinyl fluoride. In more specific variations, the sheet a self-adhesive. The decorative element is alternatively a print sensitive film (not shown) that can be laminated to the magnetic sheet. In embodiments using a film or sheet, a decorative design is added using printing, silk screening or other application of the desired decorative design. The decorative element is optionally an adhesive-backed sheet containing U.V. screening or digital ink printing of some decorative design. Where decorative element is an adhesive vinyl sheet, the vinyl sheet is optionally first printed, and subsequently mounted to the non-magnetic face of each sheet specifically place in designated positions over corresponding scores. In other variations, the decorative element is applied to the magnetic sheet in a continuous process by paint or silk screening, such as by squeegees. Alternatively, a preprinted sheet or film can be laminated to the magnetic sheet in a continuous process by pressure roller or rollers, as is known to those skilled in the art.

A series of interlocking octagonal and triangular openings are disposed on the upper longitudinal edge, the lower longitudinal edge, or both, and define at least one taper section of the magnetic cover. In specific variations, both the upper longitudinal edge and the lower longitudinal edge contain the interlocking octagonal and triangular openings, defining a plurality of taper sections disposed above and below a tubular section. Optionally, one or more tabs are disposed on a first transverse edge of the magnetic sheet, in the tubular section of the cover, with a complementary depression correspondingly disposed on a second transverse edge. In specific embodiments, the cover includes 1 tab and 1 complementary depression, 2 tabs and 2 complementary depressions, 3 tabs and 3 complementary depressions, or 4 tabs and 4 complementary depressions.

A method is also provided for the manufacturing of the magnetic cover described above. A magnetic sheet is provided, where the sheet has an upper longitudinal edge and a lower longitudinal edge, wherein the magnetic sheet comprises a magnetic face and a non-magnetic face. The magnetic face is formed from materials, as described above. The non-magnetic face of the magnetic sheet is scored with a plurality of interlocking octagonal and triangular scores on the upper longitudinal edge, the lower longitudinal edge, or on the upper longitudinal edge and the lower longitudinal edge of the magnetic sheet to form at least one taper section. A tubular section is disposed adjacent to the at least one taper section. A decorative element is applied to the non-magnetic face, where the decorative element is described above.

A series of interlocking octagonal and triangular openings on the magnetic element are cut into the upper longitudinal edge, the lower longitudinal edge, or both, wherein the plurality of interlocking octagonal and triangular openings correspond to the plurality of interlocking octagonal and triangular scores on the edges of the magnetic sheet. The interlocking octagonal and triangular scores are formed by die-cutting, laser cutting or router cutting. In specific variations, one or more tabs are disposed on a first transverse edge of the magnetic sheet, on the tubular section, with a corresponding, complementary depression on a second transverse edge.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

As used herein, the singular forms "a," "an" and "the" include plural referents unless the context clearly dictates otherwise. Thus, for example, reference to "an opening" includes both one and two or more openings and the like.

As used herein, "about" means approximately or nearly and in the context of a numerical value or range set forth means±15% of the numerical.

As used herein, "magnetic" means a material that possesses magnetic field inherently or is of a ferro-magnetic composition and therefore capable of being induced to emit magnetic fields.

As used herein, "interlocking" refers to a connection between a tab and its complementary depression so that separation or movement between the tab and depression is constrained. "Complementary" means the elements are sized and shaped to allow at least one element from one complementary half to engage at least one element from the opposing complementary half.

Figure 4:
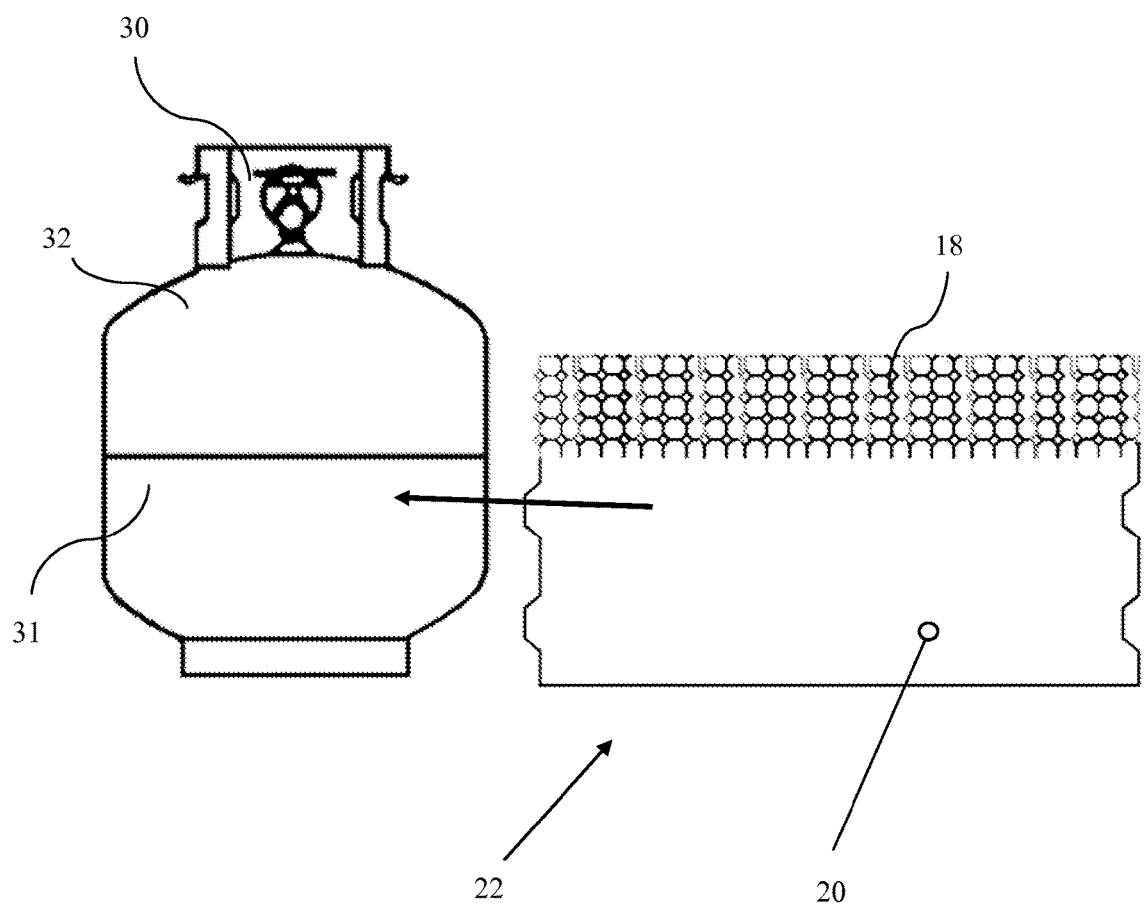
FIG. 4 is an illustration of the magnetic sheet with the top edge perforated, being applied to a propane tank.

As used herein, "upper", "above", "lower" and "bottom" are referenced based on the image depicted in FIG. 4.

Figure 6:
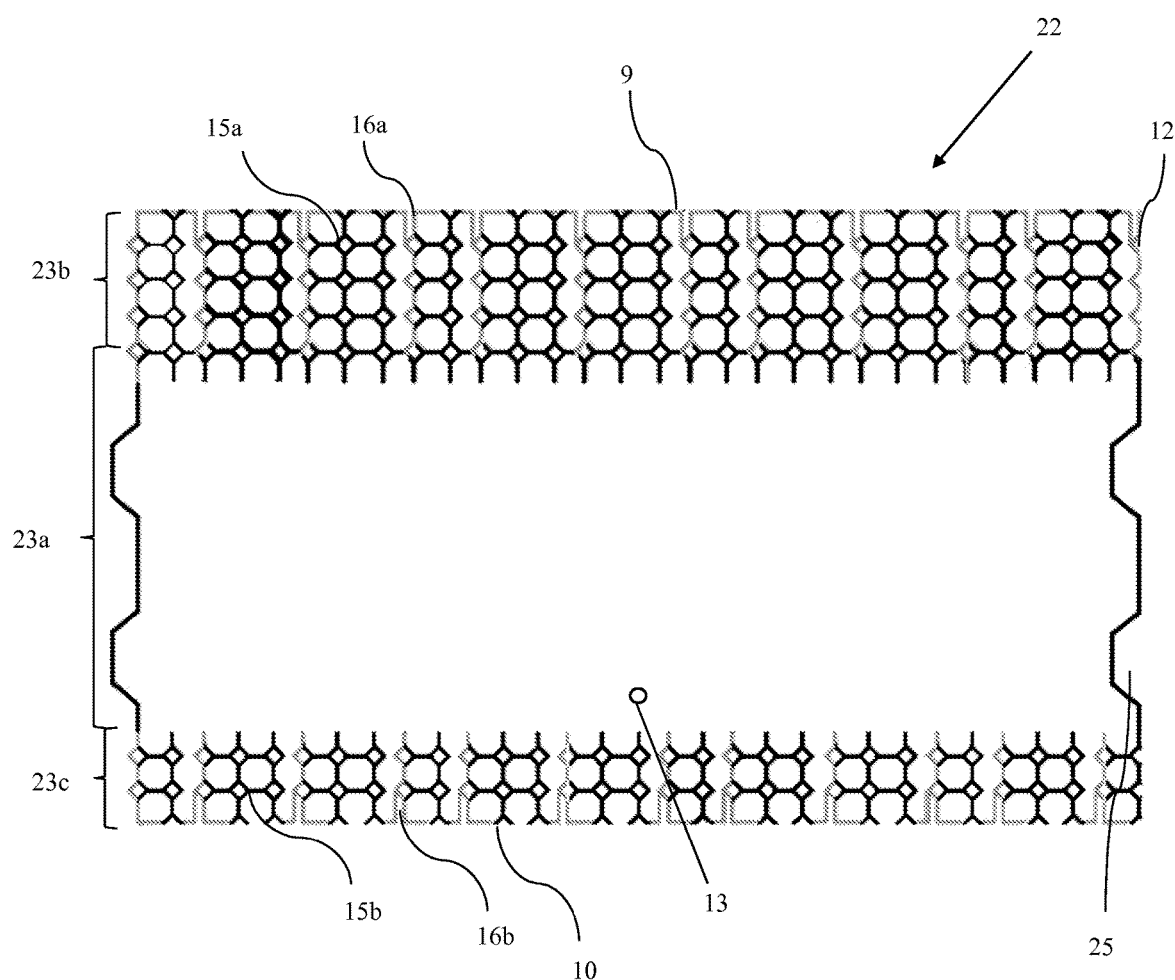
FIG. 6 is an illustration of the magnetic sheet having an upper and lower tapered section with geometric openings.

"Upper" or "above" means any portion of the cover directed to the top of FIG. 6. For example, reference number 23b is the "upper" taper section in FIG. 6 and is "above" tubular section 23a. "Lower" or "bottom" is directed toward the bottom of FIG. 4. For example reference number 23c is the "lower" taper section.

Example 1

Figure 1:
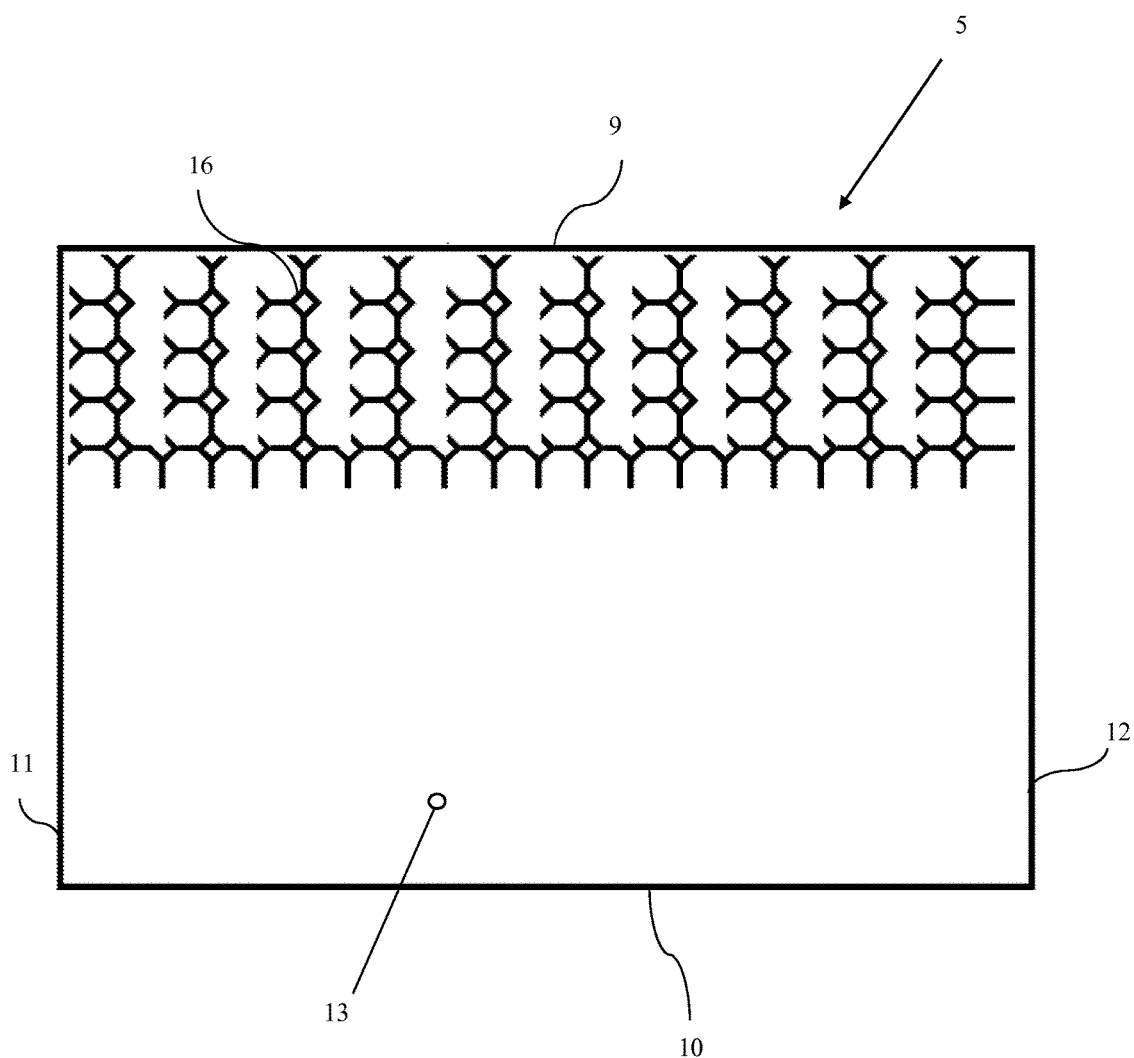
FIG. 1 is an illustration of the magnetic sheet showing the scoring on the top edge of the nonmagnetic face.
Figure 2:
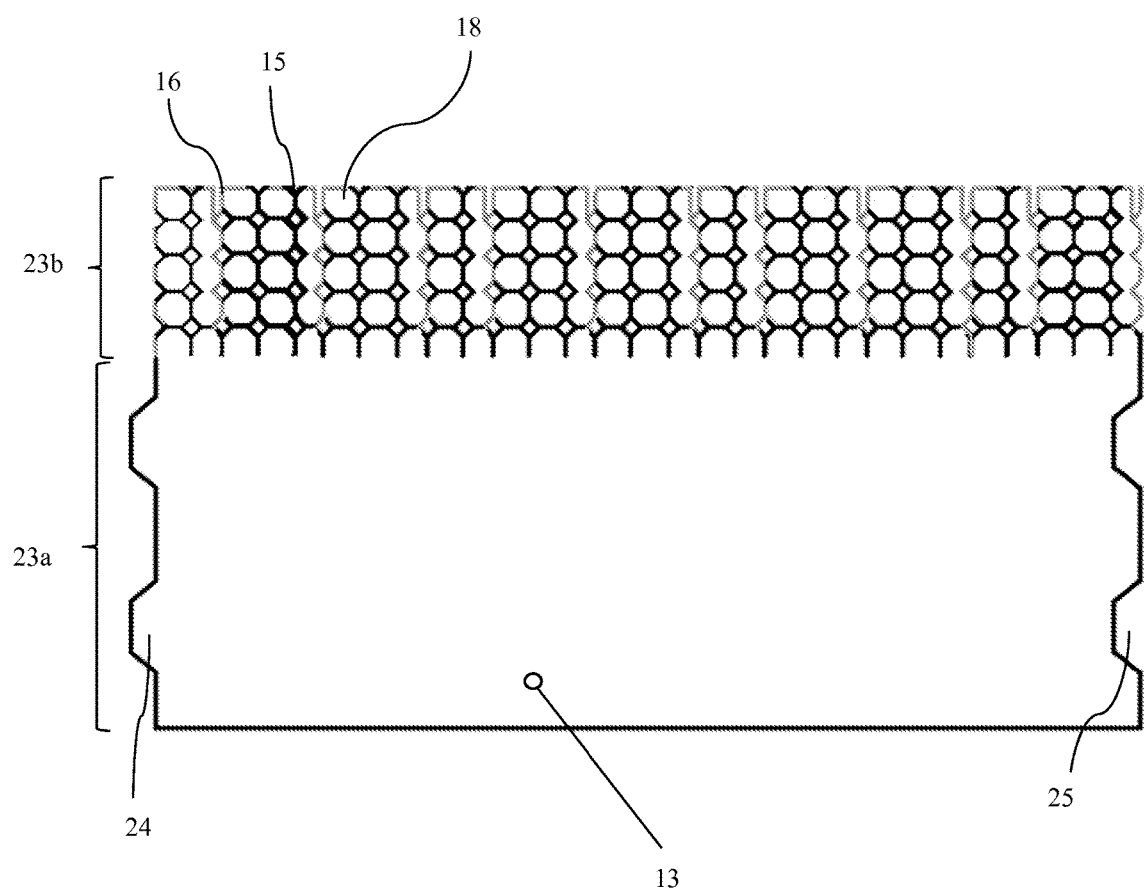
FIG. 2 is an illustration of the magnetic face of the magnetic sheet showing the geometric openings formed on the sheet with the top edge perforated. Scoring of the non-magnetic sheet was shown in black and triangular and octagonal cuts shown in gray.

Magnetic sheet 5 is formed of a ceramic magnetic powder, magnetic powder, strontium-ferrite powder, neodymium (NdFeB) powder, or a combination of materials, embedded in a synthetic rubber, elastic thermoplastic carrier. Magnetic sheet 5 therefore has a magnetic face 14 of the magnetic material formed into a film, and a non-magnetic face 13 of polymer or rubber. First transverse edge 11 is either straight, as seen in FIG. 1, or contoured with at least one tab 24, as seen in FIG. 2. In embodiments utilizing the tab, a complementary depression 25 is disposed on second transverse edge 12, as seen in FIG. 2. Magnetic sheet 5 may be manufactured with tabs and depressions, cut to form the at least one tab and depression prior to further processing of the longitudinal edge as discussed below, or cut to form the at least one tab and depression after the processing of the longitudinal edge.

Octagonal and triangular openings scores 15 were made on upper longitudinal edge 9 of non-magnetic face 13 of magnetic sheet 5 utilizing specific geometrically scoring by die-cutting, laser cutting or router cutting, seen in FIG. 1. Octagonal and triangular openings scores 15 aligned in a pattern that allows (in combination with final through cut along the outer edge) the edges of magnetic sheet 5 to form around the spherical edges of a propane tank thus eliminating all kinking that would normally occur from forming a flat sheet over a rounded surface.

Figure 3:
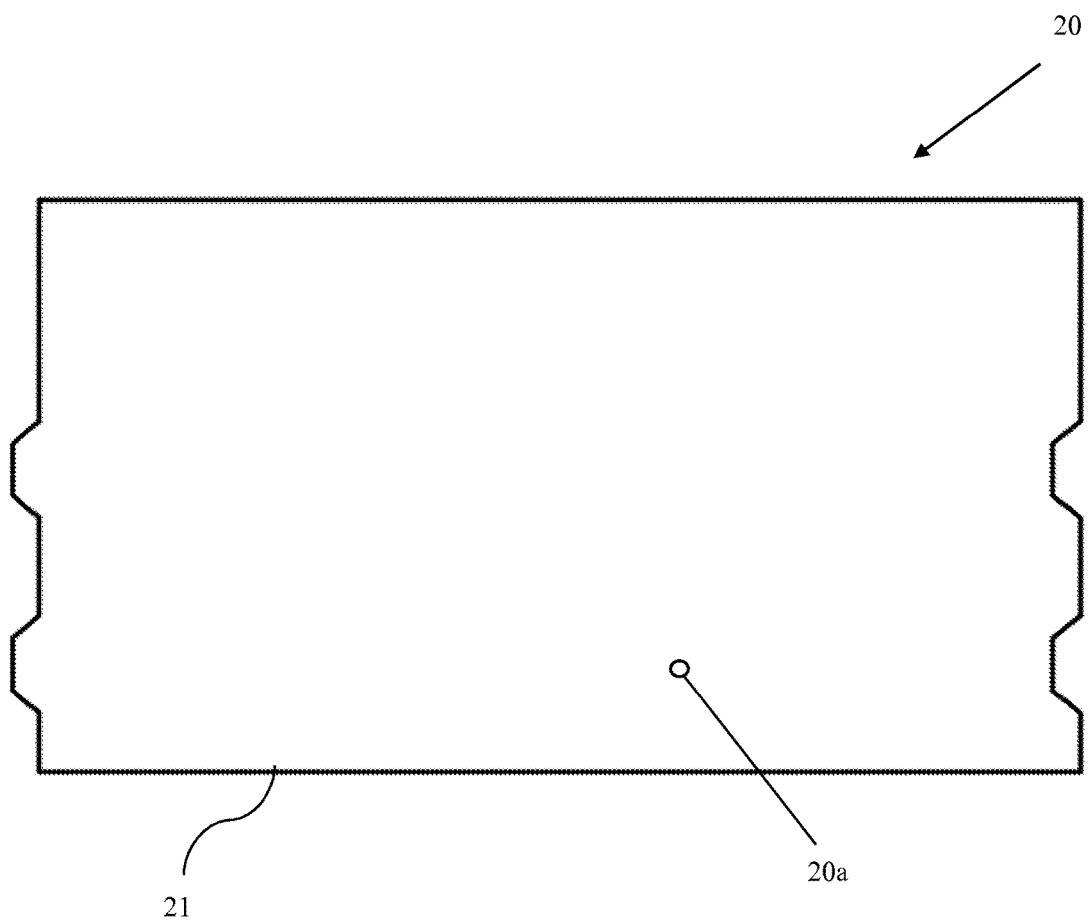
FIG. 3 is an illustration of an embodiment of the decorative element formed from a decorative sheet, such as a vinyl sheet.

After octagonal and triangular openings scores 15 were introduced to non-magnetic face 13, decorative element 20 was added to non-magnetic face 13, as seen in FIG. 2. Decorative element 20 is optionally decorative sheet 21, made of elastomeric material containing a decoration adhered to side 20a of the decorative element 20 using techniques such as silk screening, painting or other techniques known to those skilled in the art, as seen in FIG. 3. Alternatively, a vinyl sheet or alternative print sensitive film (not shown) is pre-printed with a decoration, and the pre-printed sheet is laminated to magnetic sheet 5, thereby applying the desired decorative design to non-magnetic face 13.

After mounting decorative element 20, octagonal and triangular cuts 16 were made into both the non-magnetic face 13 and magnetic face 14 of magnetic sheet 5 via steel rule die-cutter, laser cutter or router, rendering voids in magnetic sheet 5 that form octagonal and triangular openings 18, thereby forming magnetic cover 22, seen in FIG. 2. The voids, octagonal and triangular openings 18 define upper taper section 23b from tubular section 23a, and allow magnetic sheet 5 to form fit around tubular body 31 and upper taper 32 of propane tank 30, seen in FIG. 4.

Example 2

Figure 5:
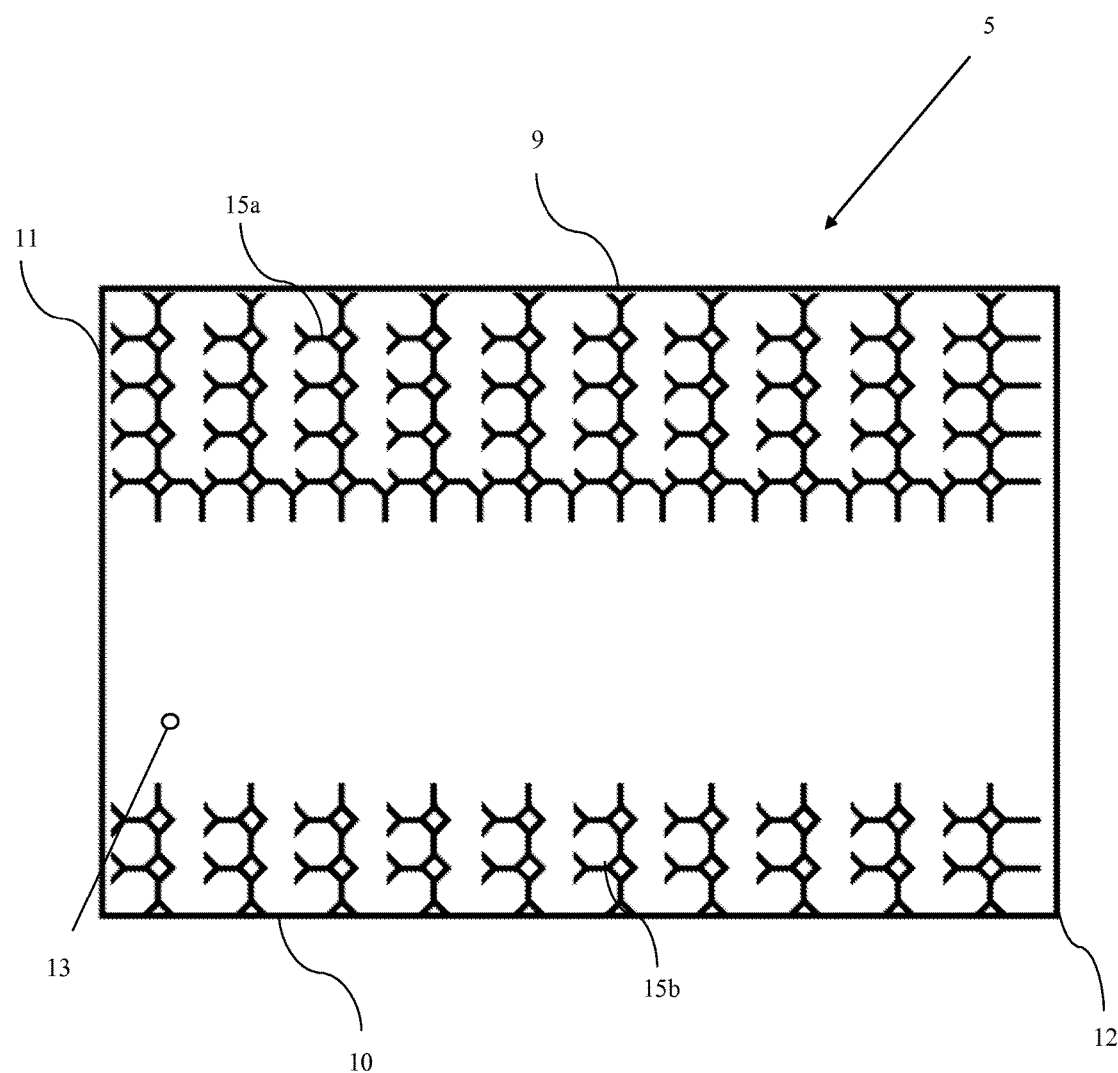
FIG. 5 is an illustration of the magnetic sheet showing the scoring on the top and bottom edges of the nonmagnetic face.

Magnetic sheet 5, as described in Example 1, was scored with a plurality of octagonal and triangular upper segment scores 15a on upper longitudinal edge 9 and lower segment scores 15b on lower longitudinal edge 10 made on the edges of the magnetic sheets of the non-magnetic side only. Scores were made utilizing specific geometrically scoring by die-cutting, laser cutting or router cutting the nonmagnetic face of each sheet of magnetic material, seen in FIG. 5.

Figure 7:
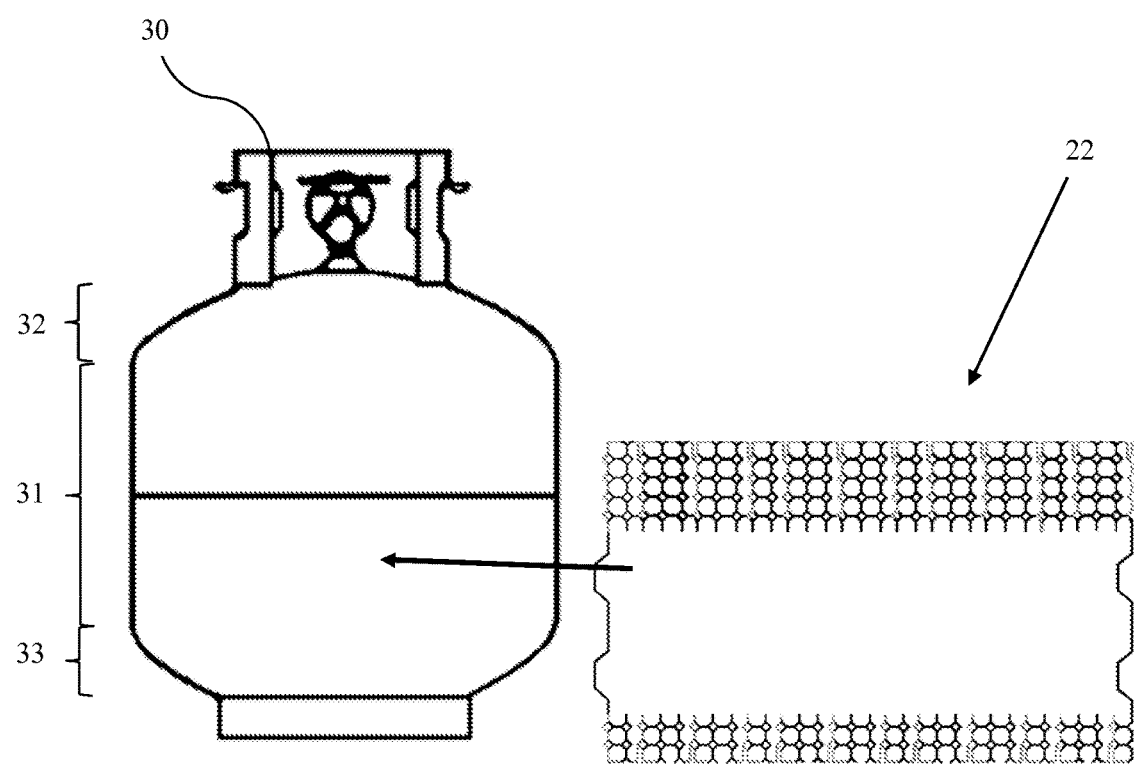
FIG. 7 is an illustration of the magnetic sheet with the top and bottom edges perforated, being applied to a propane tank.

After upper segment scores 15a and lower segment scores 15b were introduced to non-magnetic face 13, decorative element 20, as described in Example 1, was added to non-magnetic face 13. After mounting decorative element 20, magnetic sheet 5 has upper octagonal and triangular cuts 16a made into both the non-magnetic face 13 and magnetic face 14 of upper longitudinal edge 9 and lower octagonal and triangular cuts 16b made into both faces of lower longitudinal edge 10 via steel rule die-cutter, laser cutter or router, as seen in FIG. 6. Upper octagonal and triangular cuts 16a define upper taper section 23b, lower octagonal and triangular cuts 16b define lower taper section 23c, and tubular section 23a the uncut section between upper taper section 23b and lower taper section 23c. The resulting voids in each sheet form octagonal and triangular openings 18, which allow magnetic sheet 5 to form fit around tubular body 31 and upper taper 32 and lower taper 33 of propane tank 30, seen in FIG. 7, and prevent kinking that would normally occur from forming a flat sheet over a rounded surface.

Example 3

Magnetic cover 22, formed from sheet 5 and decorative element 20 disposed on the nonmagnetic face, as disclosed above in Example 1, is aligned with propane tank 30. However, the cover of the present invention can be used with other items, as would be readily apparent to one of skill in the art in light of the disclosure Magnetic cover 22 is affixed to propane tank 30 by aligning upper taper section 23b with upper taper 32 of the propane tank, seen in FIG. 4. Upon aligning upper taper 32 and upper taper section 23b, a user magnetically attaches either the right or left edge of tubular section 23a to tubular body 31 of propane tank 30, seen in FIG. 4. Tubular section 23a of magnetic cover 22 is wrapped around tubular body 31 of propane tank 30 and magnetically fixed to the propane tank. The user then magnetically attaches upper taper section 23b to upper taper 32 of the propane tank. Octagonal and triangular openings 15 provide sufficient space to allow the magnetic sections of upper taper section and lower taper section 23c to contact the propane tank without overlap of the magnetic sections.

Where at least one tab 24 is used, as discussed in Example 1, the user attached either first transverse edge 11 or second transverse edge 12 to the propane tank and wrapped magnetic cover 22 around tubular body 31 of propane tank 30, ensuring tab 24 engaged the corresponding depression 25 in tubular section 23a. Upper taper section 23b was then attached to the propane tank, as discussed above.

Example 4

Magnetic cover 22, formed as disclosed above in Example 2, is aligned with propane tank 30, or other items, as would be readily apparent to one of skill in the art in light of the disclosure. Magnetic cover 22 is affixed to propane tank 30 by aligning upper taper section 23b, followed by aligning lower taper section 23c with lower taper 33 of the propane tank. A user magnetically attaches either the right or left edge of into tubular section 23a to tubular body 31 of propane tank 30, seen in FIG. 7. Tubular section 23a of magnetic cover 22 is wrapped around tubular body 31 of propane tank 30 and magnetically fixed to the propane tank. The user then magnetically attaches upper taper section 23b to upper taper 32 of the propane tank, and lower taper section 23c to lower taper 33. Octagonal and triangular openings 15 provide sufficient space to allow the magnetic sections of upper taper section 23b and lower taper section 23c to contact the propane tank without overlap of the magnetic sections. Where one or more tabs 24 are used, as discussed in Example 2, the user attached either first transverse edge 11 or second transverse edge 12 to the propane tank and wrapped magnetic cover 22 around tubular body 31 of propane tank 30, ensuring tab 24 engaged the corresponding depression 25 in tubular section 23a. Upper taper section 23b and lower taper section 23c were then attached to the propane tank, as discussed above In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a magnetic decorative cover and method of manufacturing the same, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A magnetic cover, comprising:
    a magnetic sheet having an upper longitudinal edge and a lower longitudinal edge, wherein the magnetic sheet comprises a magnetic face and a nonmagnetic face;
    a decorative element disposed on the nonmagnetic face;
    a plurality of interlocking octagonal and triangular openings disposed on the upper longitudinal edge, the lower longitudinal edge, or a combination thereof;
        wherein the interlocking octagonal and triangular openings define at least one taper section of the magnetic cover; and
        wherein a tubular section is disposed adjacent to the at least one taper section.

2. The magnetic cover of claim 1, further comprising a plurality of taper sections disposed above and below the tubular section.

3. The magnetic cover of claim 2, further comprising at least one tab disposed on a first transverse edge of the magnetic sheet, and a complementary depression correspondingly disposed on a second transverse edge, wherein the at least one tab is disposed on a tubular section of the magnetic sheet.

4. The magnetic cover of claim 3, further comprising a plurality of tabs disposed on the first transverse edge of the magnetic sheet, and a plurality of complementary depressions disposed on the second transverse edge.

5. The magnetic cover of claim 1, further comprising at least one tab disposed on a first transverse edge of the magnetic sheet, and a complementary depression correspondingly disposed on a second transverse edge, wherein the at least one tab is disposed on a tubular section of the magnetic sheet.

6. The magnetic cover of claim 5, further comprising a plurality of tabs disposed on the first transverse edge of the magnetic sheet, and a plurality of complementary depressions disposed on the second transverse edge.

7. The magnetic cover of claim 1, wherein the decorative element is a vinyl sheet.

8. The magnetic cover of claim 7, wherein the vinyl sheet a self-adhesive sheet.

9. The magnetic cover of claim 1, wherein the magnetic sheet comprises a magnetic material in a binder, wherein the magnetic material is a ceramic magnetic powder, magnetic powder, strontium-ferrite powder, neodymium (NdFeB) powder, or a combination thereof; and wherein the binder is synthetic rubber, elastic thermoplastic carrier, or binder and a curing agent.

10. A method of manufacturing a magnetic cover, comprising:

providing a magnetic sheet having an upper longitudinal edge and a lower longitudinal edge, wherein the magnetic sheet comprises a magnetic face and a nonmagnetic face;

scoring the nonmagnetic face of the magnetic sheet with a plurality of interlocking octagonal and triangular scores on the upper longitudinal edge, the lower longitudinal edge, or on the upper longitudinal edge and the lower longitudinal edge of the magnetic sheet to form at least one taper section;

wherein a tubular section is disposed adjacent to the at least one taper section; applying a decorative element to the nonmagnetic face to form a magnetic element; and cutting a plurality of interlocking octagonal and triangular openings on the magnetic element, wherein the plurality of interlocking octagonal and triangular openings correspond to the plurality of interlocking octagonal and triangular scores on the edges of the magnetic sheet.

11. The method of claim 10, wherein the plurality of interlocking octagonal and triangular scores are formed by die-cutting, laser cutting or router cutting.

12. The method of claim 10, further comprising applying a decoration to the decorative element, wherein the decoration is applied by silk screening, painting, printing, U.V. screening, or digital ink printing.

13. The method of claim 10, wherein the decorative element is laminated to the magnetic sheet.

14. The method of claim 10, further comprising:

cutting at least one tab on a first transverse edge of the magnetic sheet, and cutting a complementary depression on a second transverse edge;

wherein the at least one tab is disposed on a tubular section of the magnetic sheet.

15. The method of claim 14, comprising:

cutting a plurality of tabs on a first transverse edge of the magnetic sheet; and cutting a plurality of complementary depressions on a second transverse edge.

* * * * *